United States Patent [19]
Son et al.

[11] Patent Number: 6,115,059
[45] Date of Patent: *Sep. 5, 2000

[54] METHOD AND SYSTEM FOR PROVIDING A MULTIVIEWING THREE-DIMENSIONAL IMAGE USING A MOVING APERTURE

[75] Inventors: Jung Young Son; Sergey A. Shestak, both of Seoul, Rep. of Korea

[73] Assignee: Korea Institute of Science and Technology, Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 09/008,580

[22] Filed: Jan. 16, 1998

[30] Foreign Application Priority Data

Jan. 18, 1997 [KR] Rep. of Korea ............ 97-1373

[51] Int. Cl.⁷ .................................................. H04N 13/02
[52] U.S. Cl. ............................. 348/46; 348/49; 359/462
[58] Field of Search .................................. 348/50, 51, 46, 348/49, 56, 42, 59, 58, 54, 106; 359/15, 22, 23, 462, 131; 355/22, 33; 378/12, 19

[56] References Cited

U.S. PATENT DOCUMENTS

| | | |
|---|---|---|
| 4,128,324 | 12/1978 | Seeger ...................................... 396/330 |
| 4,144,457 | 3/1979 | Albert ........................................ 378/12 |
| 4,622,662 | 11/1986 | Laude et al. ............................ 359/130 |
| 4,922,336 | 5/1990 | Morton ...................................... 348/51 |
| 5,132,839 | 7/1992 | Travis ....................................... 348/42 |
| 5,379,133 | 1/1995 | Kirk .......................................... 359/15 |
| 5,457,574 | 10/1995 | Eichenlaub .............................. 348/49 |
| 5,606,455 | 2/1997 | Eichenlaud ............................. 348/54 |
| 5,678,089 | 10/1997 | Bacs, Jr. et al. ......................... 348/42 |
| 5,680,171 | 10/1997 | Lo et al. ................................... 348/42 |
| 5,703,717 | 12/1997 | Ezra et al. ............................... 348/54 |
| 5,726,703 | 3/1998 | Iazawa et al. ........................... 348/46 |
| 5,801,812 | 9/1998 | Lo et al. ................................... 348/46 |
| 5,838,360 | 11/1998 | Harrold et al. ......................... 347/258 |

*Primary Examiner*—Chris S. Kelley
*Assistant Examiner*—Gims Philippe
*Attorney, Agent, or Firm*—Oblon, Spivak, McClelland, Maier & Neustadt, P.C.

[57] ABSTRACT

A multiview three-dimensional imaging system includes a large-aperture objective for focusing multiview image rays of an object incident from multiple viewing directions into a convergent zone; a scanner for scanning the focused multiview image rays at the convergent zone; and a sensor and a display for the scanned image rays. The scanner segments the focused multiview image rays into two-dimensional images from each of the multiple viewing directions. The multiview three-dimensional imaging system enables image formation with minimal light loss and image enlargement, so that a screen of arbitrary size can be employed to display the images.

13 Claims, 5 Drawing Sheets

METHOD AND SYSTEM FOR PROVIDING A MULTIVIEWING THREE-DIMENSIONAL IMAGE USING A MOVING APERTURE

BACKGROUND OF THE INVENTION

1. Technical Field

The present invention relates, in general, to a method and system for providing a multiview three-dimensional image of an object and, in particular, to a method and system for providing a multiview three-dimensional image of an object by using a moving aperture realized with a scanner.

2. Description of Related Art

Several methods have conventionally been used for capturing two-dimensional perspective images of a three-dimensional object from a plurality of viewing directions in order to provide a multiview three-dimensional image of the object. These methods involve: (1) using a plurality of synchronized cameras, where each camera captures two-dimensional images from a different one of the plurality of viewing directions; (2) using a single camera moved in succession to each of the plurality of viewing directions, where the camera captures two-dimensional images from each of the plurality of viewing directions; or (3) using a single stationary camera having a wide aperture objective lens and spatially modulating the light transmitted by the lens with a plurality of elecrtro-optical shutters, where each of the shutters corresponds to a different one of the plurality of viewing directions.

In the first method, multiple synchronized cameras capture two-dimensional images of the object at 30 frames per second and send the captured images to a receiving device. The receiving device superposes the two-dimensional images and transmits the superposed images to a display device. A special optical plate, such as a lenticular screen, a parallax barrier, or a holographic screen, is needed to display the superposed images.

In the second method, a single camera must be moved to each of the plurality of viewing directions. However, it is difficult to move a camera between adjacent viewing directions quickly enough to enable the camera to capture 30 images per second of an object, especially a moving object, from each of the plurality of viewing directions.

In the third method, multiple electro-optical shutters, such as liquid crystal shutters, are arranged at the principal plane of a camera's wide-aperture objective. By sequentially opening and closing successive shutters, two-dimensional images of an object are captured from each of the plurality of viewing directions. Although this method requires only a single stationary camera to obtain multiview images comparable to those obtained with multiple synchronized stationary cameras, considerable light is lost at the shutters. For example, when liquid crystal shutters are used, more than ¾ of the incident light is attenuated by polarizers attached to the shutters, so that the brightness of the images is greatly reduced. Moreover, since the camera must have a large aperture objective, the two-dimensional image sensor must have a correspondingly large sensitive area. In addition, since each shutter must open and close 30 times per second to capture 30 images per second from each viewing direction, high speed shutters are required.

SUMMARY OF THE INVENTION

It is therefore one object of the present invention to provide a method and system for providing a bright and clear multiview three-dimensional image of an object.

It is another object of the present invention to provide a method and system for providing a multiview three-dimensional image of an object by moving an aperture across the entrance pupil of a large-aperture objective lens.

In accordance with the present invention, a method for providing a multiview three-dimensional image of an object comprises the steps of: focusing multiview image rays of the object incident from a plurality of viewing directions at a given area; scanning said focused multiview image rays of the object at the given area, whereby two-dimensional perspective images of the object as viewed from different viewing directions are formed; and projecting said two-dimensional perspective images to a display device.

In accordance with another aspect of the present invention, a system for providing a multiview three-dimensional image of an object comprises means for focusing multiview image rays of the object incident from a plurality of viewing directions to a given area; means for repetitively scanning said focused multiview image rays of the object at the given area; and means for receiving and displaying said scanned image rays.

In one embodiment of the present invention, the scanning means includes an optical element (mirror) for changing the direction of light incident thereon, which is installed at a convergent zone of a lens with a large diameter. The scanning means is driven to define a moving aperture so that an image of the object can be segmented according to various viewing directions. The segmented images of the object are transmitted through an objective lens and a two-dimensional image sensor (or optical fibers) without image loss. The transmitted images are projected onto a screen in a sequential order of the images by a second scanner. The maximum number of the segmented images are determined by the effective width of the moving aperture.

DETAILED DESCRIPTION OF PREFERRED EMBODIMENT

Figure 1:
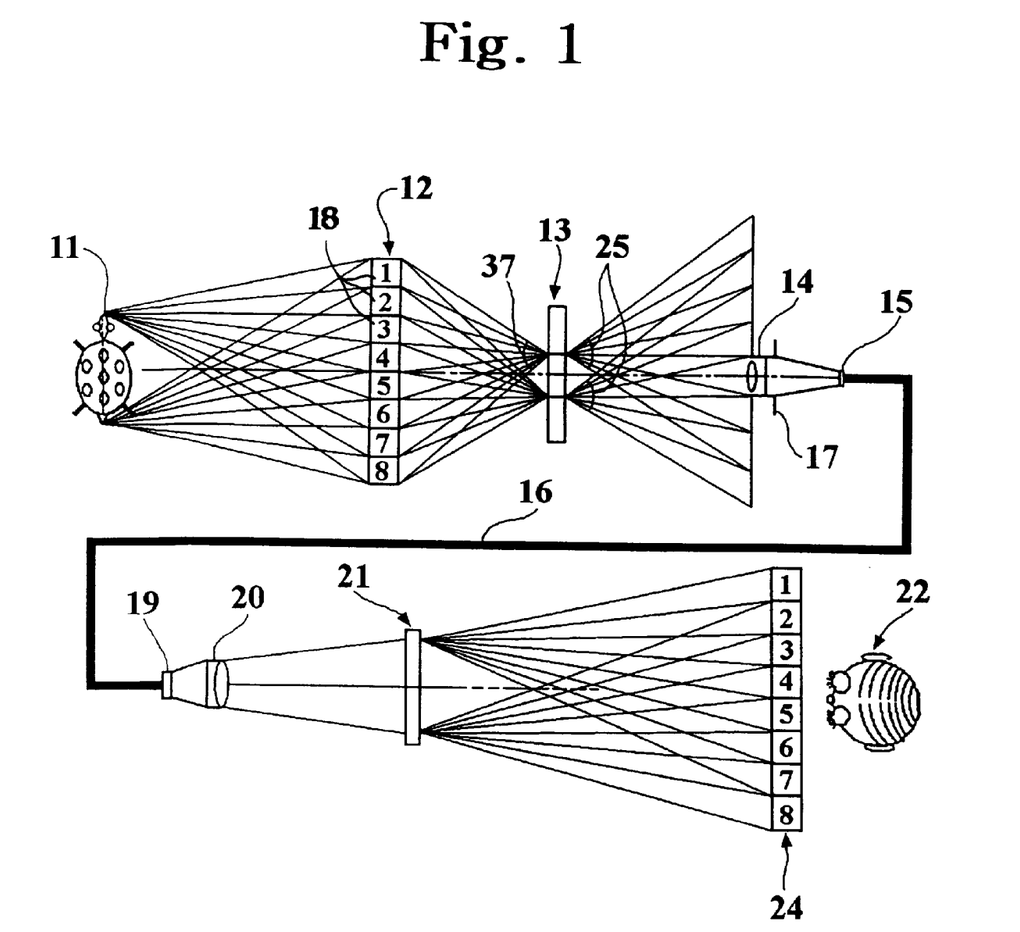
FIG. 1 is a schematic diagram of a three-dimensional imaging system in accordance with an embodiment of the present invention.

As shown in FIG. 1, the multiview three-dimensional imaging system of the present invention comprises a large-aperture objective 12, a first scanner 13, a small objective lens 14, a transmission device consisting of an input end 15, a transmission line 16, and an output end 19, a projection lens 20, a second scanner 21, and image detection and display devices (not shown).

The large-aperture objective 12 focuses multiview image rays of an object incident on the objective from a plurality of viewing directions and thereby forms a de-magnified and overlapped three-dimensional image of the object at a convergent zone. The first scanner 13, which is disposed within the convergent zone, scans the de-magnified and overlapped three-dimensional image, collects rays corresponding to each of the plurality of viewing directions, and deflects them to a small objective lens 14 through an angle that depends on the viewing direction.

The small objective lens 14 re-focuses at the input end 15 of the transmission device those image rays deflected by the first scanner 13. In addition to the input end disposed at the image plane of the small objective, the transmission device includes a transmission line 16 and an output end 19 that directs the transmitted image rays to a projection lens 20. The projection lens 20 magnifies the images received from the output end 19 of the transmission device. The magnified images of the object are scanned by the second scanner 21, which is disposed where the magnified images of the object are formed and operates in synchrony with the first scanner. The scanned images are formed at a viewing zone 24, where they may be observed by a viewer 22.

Figure 2:
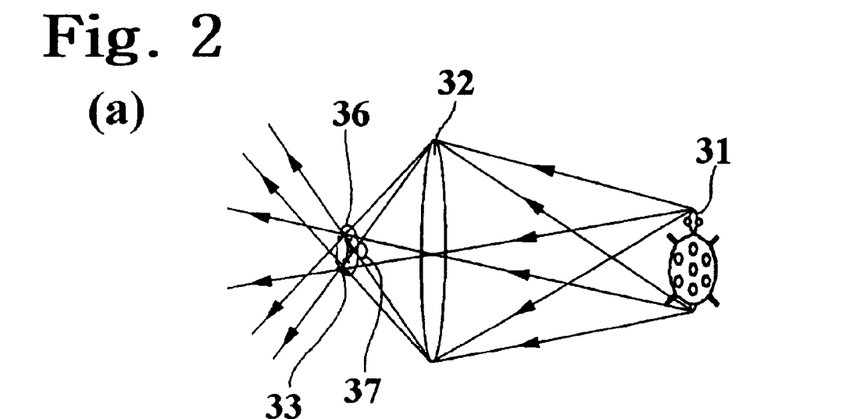
FIGS. 2a–2c illustrate large-aperture objectives that can be used to realize a three-dimensional imaging system in accordance with embodiments of the present invention.

FIGS. 2a–2c illustrate large-aperture objectives 12 that may be utilized to realize the multiview three-dimensional imaging system of the present invention. The convergent zone 36 is an area within the field of view of an image sensor device (not shown) at which a scene 33 that includes the object 31 is imaged. The angular extent of the de-magnified and overlapped three-dimensional image 33 is determined by the angular spread of the viewing directions.

FIG. 2a illustrates formation of the de-magnified and overlapped three-dimensional image at a convergent zone 36 corresponding to a convergence angle 37, when a large-aperture lens 32 is utilized as the large-aperture objective. The convergence angle 37 depends on both the focal length of the large-aperture objective lens 32 and the location of the object.

FIG. 2b illustrates formation of the convergent zone 36 when a spherical mirror 34 is utilized as the large-aperture objective. When either a large-aperture objective lens 32 or a spherical mirror 34 is employed as the large-aperture objective, the convergent zone 36 is located where the image of the object is formed. However, as shown in FIG. 2c, when a spherical mirror comprising a plurality of small flat or spherical mirrors is employed as the large-aperture objective, the convergent zone 36 is located where the images reflected from the small flat or spherical mirrors overlap.

FIGS. 3a–3e illustrate scanners that can be utilized to realize a moving aperture in a three-dimensional imaging system in accordance with the present invention. As was described in detail above with reference to FIG. 1, the first scanner 13, which is located at the convergent zone 36, segments the de-magnified and spatially overlapped three-dimensional image of the object into as many two-dimensional images as there are different viewing directions. The positions of the two-dimensional images are determined by the orientation of a rotating mirror of the first scanner 13 that deflects the image rays to the small objective 14.

As the three-dimensional is being segmented, an image of the small objective is formed at the large-aperture objective lens 12. The size of this image is equal to the size of working part of the large-aperture objective lens. As the scanner's mirror rotates, the entrance pupil of the small objective 14 scans over the exit pupil of the large-aperture objective lens 12. Since the exit pupil of the large-aperture objective lens 12 is "virtually divided" into multiple segments by the scanning small objective, the small objective acts as though it were a moving aperture. The number of segments into which the large aperture objective is divided is equal to the ratio of the diameter of the exit pupil of the large-aperture objective lens 12 to the diameter of the image of the entrance pupil of the small objective 14.

Figure 3:
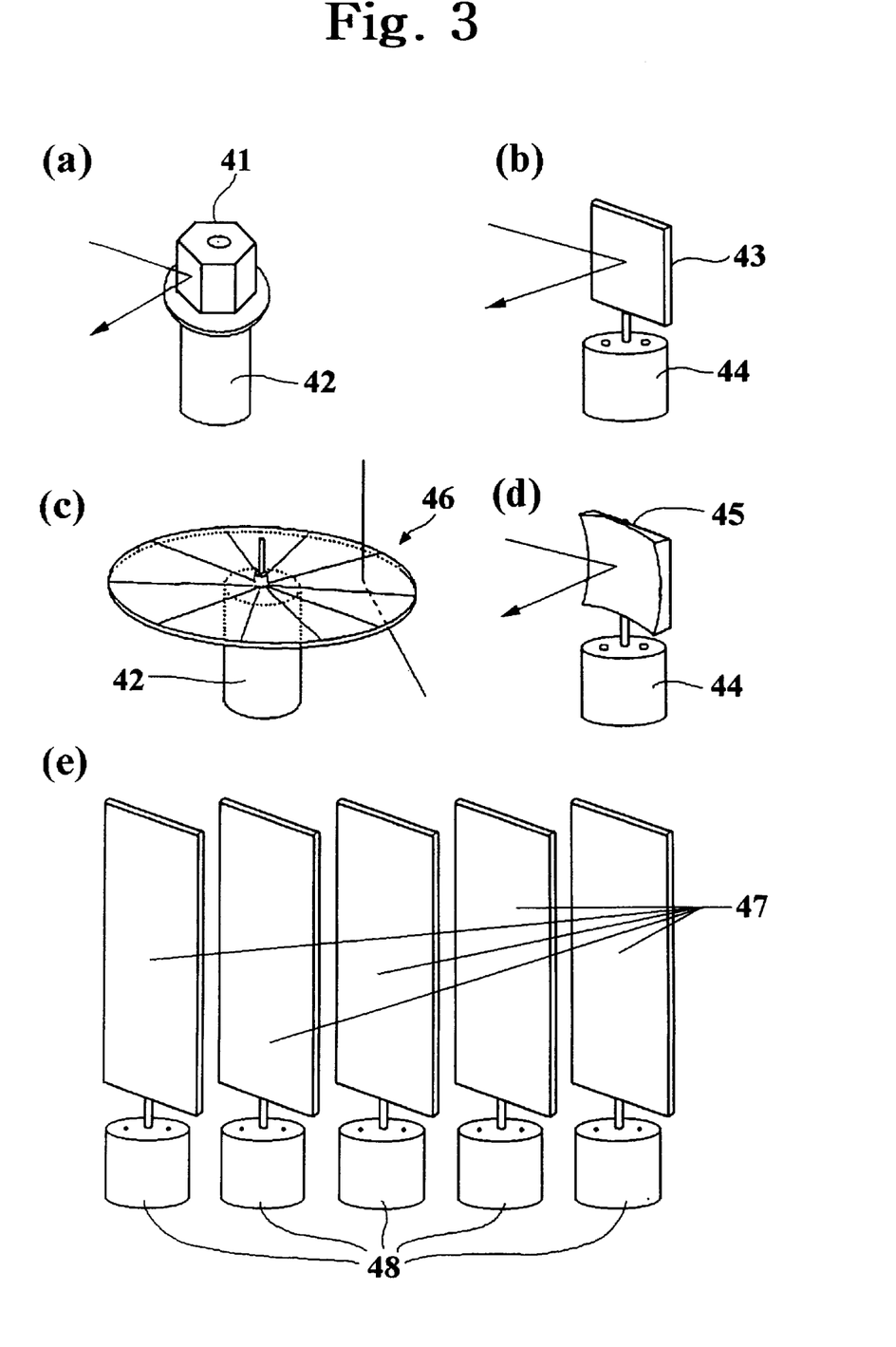
FIGS. 3a–3e illustrate scanners that can be utilized to realize a moving aperture in a three-dimensional imaging system in accordance with embodiments of the present invention.

The scanner shown in FIG. 3a utilizes a rotating polygonal mirror 41 and a scanner driver 42, such as a stepper motor. In the scanners shown in FIGS. 3b and 3d, a scanner driver 44, such as a galvanometer, periodically rotates a small flat mirror 43 and a spherical mirror 45, respectively. FIG. 3c illustrates a projecting scanner with a holographic disk, and FIG. 3e illustrates a scanner that achieves a large scanning area with a number of smaller synchronized scanning areas. Since a driver capable of driving a large mirror could typically be difficult to obtain, a large mirror would typically be realized by combining a number of closely spaced smaller mirrors 47 and a number of drivers 48 attached to the smaller mirrors 47. Synchronously rotating the smaller mirrors 47 would produce the same effect as rotating a single large mirror. The area of the working aperture and the deflection angle of the scanner must be at least as large as the area of the convergent zone along the optical axis and the maximum convergence angle, respectively.

When vertical scanning is combined with horizontal scanning, a three-dimensional image with full parallax may be formed. The scanned images would be focused by a field lens to the size of the aperture at the input end 15 of the transmission device, then gathered into an image by another lens, and finally transmitted with little diminution of image brightness.

Figure 4:
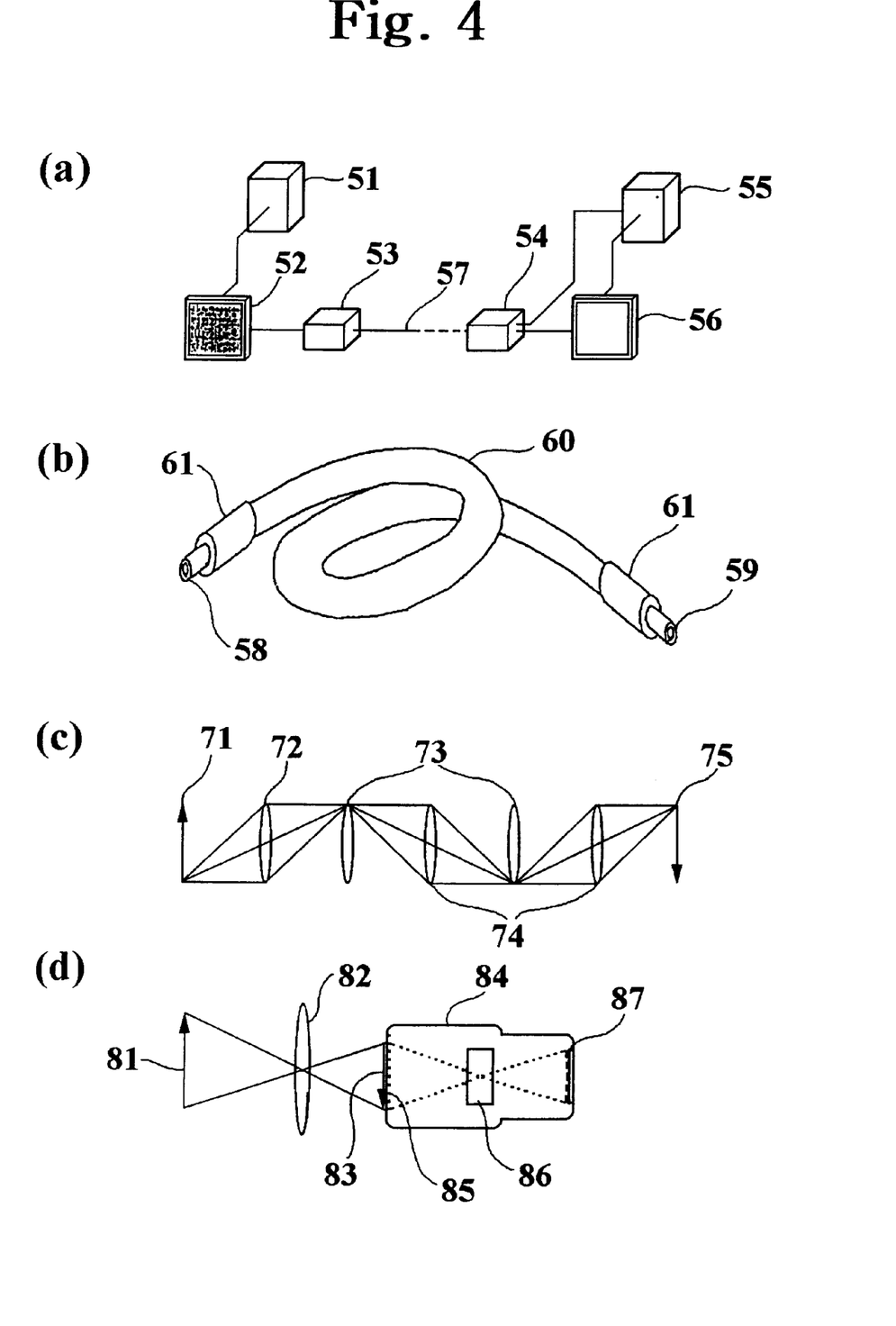
FIGS. 4a–4d illustrate devices for transmitting the two-dimensional images segmented by the scanners of a three-dimensional imaging system in accordance with embodiments of the present invention.

FIGS. 4a–4d illustrate devices that can be utilized transmit the two-dimensional images segmented by scanners in a three-dimensional imaging system in accordance with the present invention. As shown in FIG. 4a, the segmented two-dimensional images are sequentially input to an image detector 52, such as a CCD, and converted into pixel signals by a detector controller 51. The pixel signals are directed from the detector 52 to the transmission device 53, which in turn directs them to a receiver 54 through either a transmission line 57 or wireless link (not shown), and are finally displayed on an image display device 56 controlled by a display controller 55.

FIG. 4b illustrates a transmission device that includes a fiber optic bundle 60. The images segmented by the scanner are re-focused at the input end 58 of the fiber optic bundle 60 and directed to a receiver through the output end 59 of the fiber optic bundle 60.

FIG. 4c illustrates a transmission device that employs such a lens as a periscope. An output image 75 is formed when a two-dimensional input image 71, segmented in accordance with the viewing directions, traverses an objective lens 72, a field lens 73, and a relay lens 74. The field lens 73 transfers the input image 71 from the objective lens 72 to the output end of the transmitting device without image loss.

FIG. 4d illustrates an infrared image transmission device. If the image 81 is captured by an infrared objective lens 82 and formed at the input end of an image intensifier 84, i.e., a photocathode 95, the image at the photocathode 95 is enlarged and focused at a fluorescent screen. Signal processing in the receiver must be at least as fast as signal propagation in the transmission device in order to be able to effect real-time signal processing. For image transmission via either an optical fiber bundle or a lens, all images are transmitted with essentially no intermission between images from different viewing directions. If the transmission device further includes data compression and decompression means, it is possible to rapidly transmit image data with a high quality.

The operation of the multiview three-dimensional imaging system of the present invention is described immediately below with reference to FIG. 1. If the first scanner 13 were not disposed at the convergent zone, the image rays corresponding to each of the viewing directions would diverge at various angles equal to the convergence angle 37. However, the first scanner 13 sequentially deflects image rays from each of the viewing directions to the small objective lens 14. It is preferable to dispose means for discriminating image rays of particular viewing directions, such as a diaphragm (not shown), at the small objective lens 14.

As described above, the exit pupil of the large-aperture objective lens 12 is "virtually divided" by the first scanner 13 into a number of segments corresponding to the ratio of the diameter of the exit pupil of the large-aperture objective lens 12 to the diameter of the image of the entrance pupil of the small objective 14. The three-dimensional image formed by the large-aperture objective lens 12 is thereby segmented into a number of two-dimensional images, each corresponding to a different one of the viewing direction in accordance with the rotational characteristics of the first scanner 13. The segmented two-dimensional images are re-focused at either the two-dimensional image detector or the input end of the optical fiber bundle (shown in FIG. 2) and then directed to the output end 19 through the transmission line 16. It is preferable to dispose a field lens close to the first scanner 13 so that the two-dimensional images with different viewing directions can be re-focused to the size of the small objective lens 14. The images transmitted through the transmission line 16 are enlarged by the projection lens 20. The second scanner 21, which is synchronized with the first scanner 13, reconstructs the original image of the object from the segmented two-dimensional images corresponding to the plurality of viewing directions. Since the images enlarged by the projection lens 20 are formed at the mirror of the second scanner 21, the images may be magnified by increasing the size of the mirror. The multiview three-dimensional imaging system according to the present invention is thus capable of enlarging the images deflected by the second scanner 21 and projecting them onto a screen, such as a holographic screen, so that a viewer can observe the image at the display device.

Figure 5:
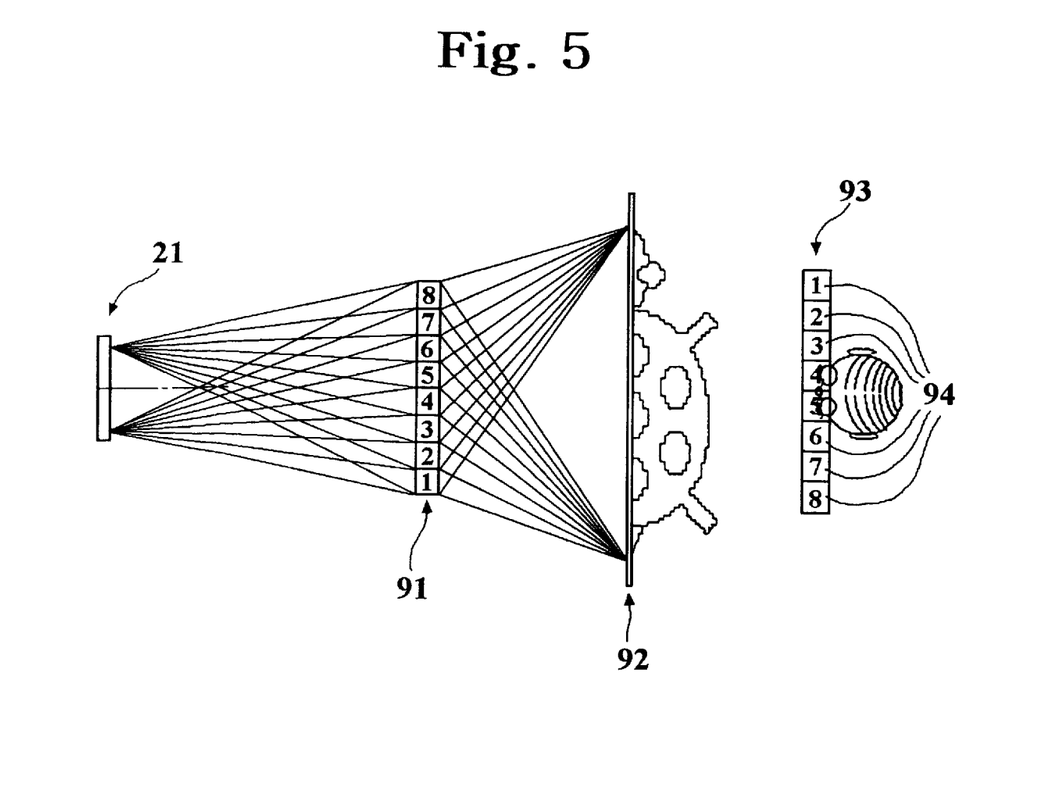
FIG. 5 illustrates a method of enlarging an image by means of a special image screen in accordance with an embodiment of the present invention.

FIG. 5 illustrates a method of enlarging a multiview three-dimensional image by means of a special image screen, such as a holographic screen or a Fresnel lens. If the two-dimensional images are deflected by the second scanner 21 and then magnified and projected onto the special image screen 92 by a large-aperture objective 91, a magnified multiview three-dimensional image may be viewed on the special image screen 92 by an observer in a view zone 93. (All images corresponding to the output apertures of the large-aperture objective lens 91 are formed in the view zone 93.) The location of an image in the view zone 93 depends on the location of the output aperture of the large-aperture objective lens 91 through which the rays that form the image pass. The image formation area for the image corresponding to rays from a particular viewing direction is called a sub-view zone 94. The sub-view zones are sequentially disposed, because the two-dimensional images corresponding to the different viewing directions are formed sequentially. The spatial separation between two adjacent sub-view zones must be less than or equal the average separation between the right and left eyes of an observer, so that images in adjacent sub-view zones may be formed at the right and left eyes of an observer and a magnified three-dimensional image thereby observed.

A particular embodiment of the present invention has been described in detail above in connection with a particular field of application. Those of ordinary skill in the art with access to the teachings of the present invention will recognize modifications, additional embodiments, and additional fields of application of the present invention. The appended claims are accordingly intended to cover any and all such modifications, embodiments, and fields of applications within the scope of the present invention.

What is claimed:

1. A method for providing a multiview three-dimensional image of an object, the method comprising the steps of:

focusing multiview image rays of the object incident from a plurality of viewing directions by means of a large-aperture objective, whereby a demagnified three-dimensional image of the object is formed at a convergent zone;

scanning the focused multiview image rays of the object by means of a first scanning device disposed at the convergent zone, whereby two-dimensional images are formed, each an image of the object as viewed from a different one of the plurality of viewing directions;

re-focusing the two-dimensional images of the object at a transmission device;

transmitting the re-focused two-dimensional images by means of the transmission device; and projecting the transmitted re-focused two-dimensional images on a display device, whereby a multiview three-dimensional image of the object is provided.

2. The method according to claim 1, wherein said scanning step includes defining, by means of the first scanning device, a moving aperture that virtually divides an entrance pupil of the large-aperture objective into a plurality of segments, each segment corresponding to a different one of the plurality of viewing directions.

3. The method according to claim 2, further comprising the steps of:

projecting the two-dimensional images to a second scanning device that operates in synchronism with the first scanning device; and reconstructing the multiview three-dimensional image of the object from the two-dimensional perspective images projected to the second scanning device.

4. The method according to claim 2, further comprising the steps of:

compressing the re-focused images of the object immediately before the transmitting step is executed; and decompressing the compressed images of the object immediately after the transmitting step is executed.

5. A system for providing a multiview three-dimensional image of an object, the system comprising:

means for focusing multiview image rays of the object incident from a plurality of viewing directions at a convergent zone;

means for scanning the focused multiview image rays of the object, the scanning means disposed at the convergent zone;

means for re-focusing the two-dimensional images of the object;

means for transmitting the re-focused two-dimensional images of the object; and means for projecting the transmitted two-dimensional images to a display device so that the projected two-dimensional images are observable by a viewer as a multiview three-dimensional image of the object.

6. The system according to claim 5, wherein said scanning means includes a light deflecting device.

7. The system according to claim 5, further comprising:
   means for projecting the two-dimensional images of the object; and
   means for reconstructing the multiview three-dimensional image of the object from the two-dimensional images of the object, the reconstructing means being disposed where said two-dimensional perspective images of the object are projected and operating in synchronism with the scanning means.

8. The system according to claim 5, wherein said focusing means includes a convex lens, a concave mirror, or a concave mirror comprising multiple flat mirrors or spherical mirrors.

9. The system according to claim 7, wherein said means for producing the re-focused two-dimensional perspective images comprises an objective lens with a diaphragm installed at the input aperture thereof.

10. The system according to claim 5, wherein said scanning means includes a flat mirror, a spherical mirror, or a holographic disk including multiple flat mirrors spaced at a regular interval.

11. The system according to claim 7, wherein said transmitting means includes a light conduit, an optical fiber, focusing multiview image rays of the object incident from a plurality of viewing directions by means of a large-aperture objective, whereby a demagnified three-dimensional image of the object is formed at a convergent zone;

scanning the focused multiview image rays of the object by means of a first scanning device disposed at the convergent zone, whereby two-dimensional images are formed, each an image of the object as viewed from a different one of the plurality of viewing directions;

re-focusing the two-dimensional images of at a transmission device; and transmitting the re-focused two-dimensional images by means of the transmission device; and projecting transmitted re-focused two-dimensional images to a display device, whereby a multiview three-dimensional image of the object is provided.

12. The system according to claim 7, wherein said transmitting means further comprises:
   means for compressing said re-focused two-dimensional perspective images of the object; and
   means for decompressing said compressed re-focused two-dimensional perspective images of the object.

13. The system according to claim 7, wherein said display device is a holographic screen or a Fresnel lens.

\* \* \* \* \*

UNITED STATES PATENT AND TRADEMARK OFFICE
CERTIFICATE OF CORRECTION

PATENT NO. : 6,115,059
DATED : September 5, 2000
INVENTOR(S) : Jung Young Son et al It is certified that error appears in the above-identified patent and that said Letters Patent is hereby corrected as shown below:

Please amend claim 11 as follows:

11. The system according to claim 7, wherein said transmitting means includes a light conduit, an optical fiber, or a TV system.

[focusing multiview image rays of the object incident from a plurality of viewing directions by means of a large-aperture objective, whereby a demagnified three dimensional image of the object is formed at a convergent zone;

scanning the focused multiview image rays of the object by means of a first scanning device disposed at the convergent zone, whereby two-dimensional images are formed, each an image of the object as viewed from a different one of the plurality of viewing directions;

re-focusing the two-dimensional images of at a transmission device; and transmitting the re-focused two-dimensional images by means of the transmission device; and projecting transmitted re-focused two-dimentional images to a display device, whereby a multiview three-dimensional image of the object is provided.]

Signed and Sealed this

Fourth Day of September, 2001

*Attest:*

*Attesting Officer*

NICHOLAS P. GODICI
*Acting Director of the United States Patent and Trademark Office*